United States Patent [19]

Werner

[11] Patent Number: 4,761,077
[45] Date of Patent: Aug. 2, 1988

[54] MIXING APPARATUS

[75] Inventor: Roy H. Werner, Upper St. Clair, Pa.

[73] Assignee: Barrett, Haentjens & Co., Hazelton, Pa.

[21] Appl. No.: 103,541

[22] Filed: Sep. 28, 1987

[51] Int. Cl.$^4$ .............................................. B01F 15/02
[52] U.S. Cl. ..................................... 366/165; 137/896
[58] Field of Search ............... 366/165, 150, 167, 173, 366/176, 177; 137/888, 896

[56] References Cited

U.S. PATENT DOCUMENTS

| 4,123,800 | 10/1978 | Mazzei | 366/165 |
| 4,416,610 | 11/1983 | Gallagher | 137/888 |
| 4,474,477 | 10/1984 | Smith | 366/165 |
| 4,483,805 | 11/1984 | Glindsjo | 137/896 |
| 4,564,298 | 1/1986 | Gritters | 137/896 |

Primary Examiner—Robert W. Jenkins
Attorney, Agent, or Firm—William J. Ruano

[57] ABSTRACT

Mixing apparatus including a cylindrical mixing chamber having a fluid inlet at one end, a frusto-conical tubular end piece connected to the other end and flaring outwardly by progressively increasing in diameter in an outward direction to form a fluid outlet. The cylindrical mixing chamber has a plurality of rows of openings inclined inwardly towards the fluid outlet. An outer jacket surrounds the cylindrical mixing chamber in spaced relationship therewith to form a liquid receiving chamber. The inlet is shaped as to introduce liquid tangentially into said liquid receiving chamber so as to obtain greater water flow and less turbulence in said liquid receiving chamber.

10 Claims, 2 Drawing Sheets

MIXING APPARATUS

BACKGROUND OF THE INVENTION

This invention relates to an apparatus for continuously mixing gases, liquids and solids and combinations thereof. It is an improvement over U.S. Pat. No. 4,474,477 dated Oct. 2, 1984 in which applicant is a co-inventor.

The device described in said patent involves inward liquid feed from diametrically opposite inlets, whereby liquid streams are in directly opposite relationship, causing substantial air-to-water volume and turbulence, restricted water flow to the outlet, also substantial back pressure and build-up within the unit of dry solid reagents because of the enclosed inlet end, and lengthy disassembly time of the unit, and the requirement of substantial inlet liquid feed pressure.

An object of the present invention is to overcome the above-named disadvantages.

SUMMARY OF THE INVENTION

This invention overcomes the above-named disadvantages by providing tangential water flow in the mixing chamber, an open and curved inlet end for smoother air flow and increased volume, a flared outlet end piece for increased volume and less back pressure, as well as increased volume and easier flow through the plurality of rows of flared inlets in the wall of the cylindrical mixing chamber, also more thorough mixing and stripping of deleterious gases to the environment, such as radon gas.

BRIEF DESCRIPTION OF THE DRAWINGS

FIG. 3a is a section along line 3a-3a.

Figure 1:
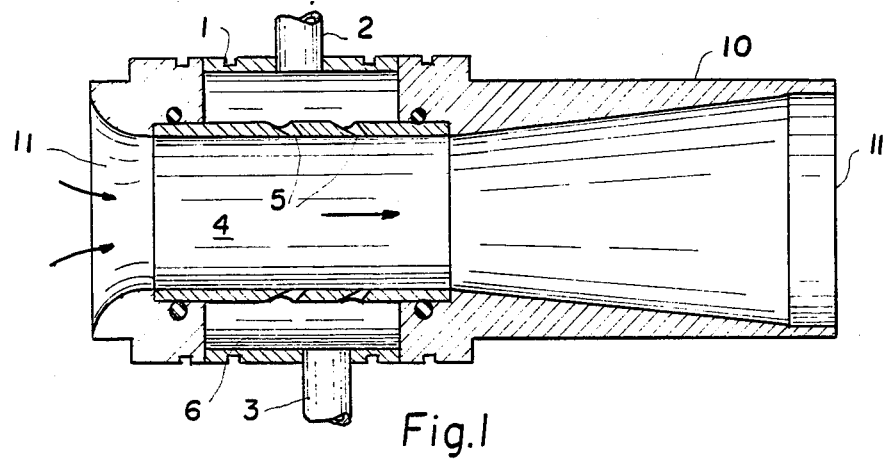
FIG. 1 is a vertical cross-section taken along line 1—1 of FIG. 2.
Figure 2:
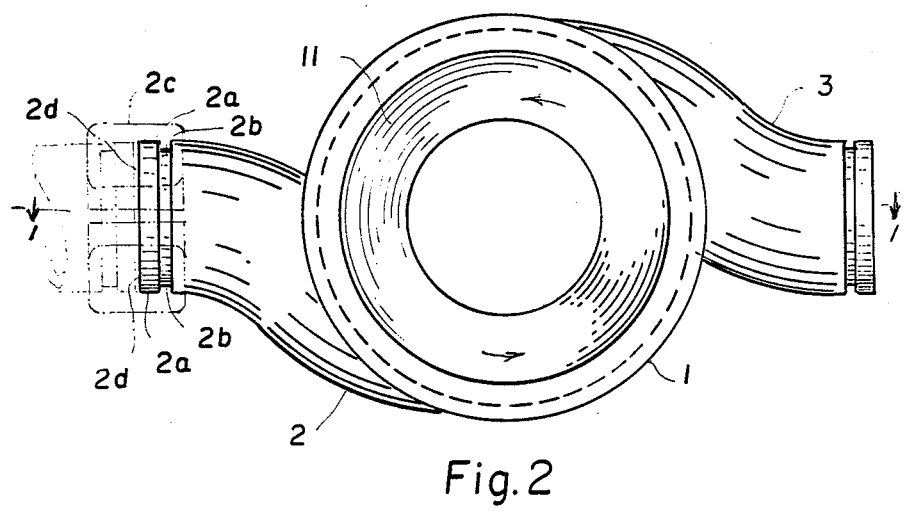
FIG. 2 is an elevational view taken from one side of FIG. 1.

Referring more particularly to FIGS. 1 and 2 of the drawing, numeral 1 denotes an outer casing of aluminum or other suitable material having liquid inlets 2 and 3 on diametrically opposite sides of the casing through which raw water enters in opposing relationship but which inlets are curved in a direction to provide tangential flow in chamber 6, as shown in FIG. 2, which tangential flow is in the direction shown by the arrows in FIG. 2.

A cylindrical mixing chamber 4 is provided with a plurality of rows of inclined openings 5 which are directed generally towards the outlet defined by a frusto-conical tubular end piece 10 through which mixed liquid exits in the direction of the arrow, progressively increasing in diameter through the flared end piece to permit increased volume and less back pressure in fluid flow therethrough. Instead of a straight inner surface as shown, it may be progressively curved outwardly toward the exit.

Figure 3:
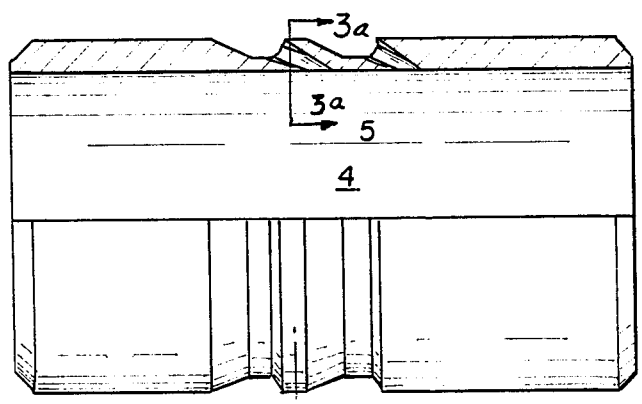
FIG. 3 is a fragmentary view of the perforated cylindrical mixing chamber of FIG. 1 showing the inlet openings.
Figure 3A:
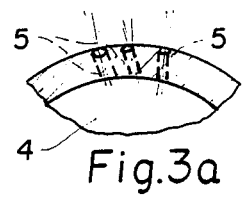
Figure 4:
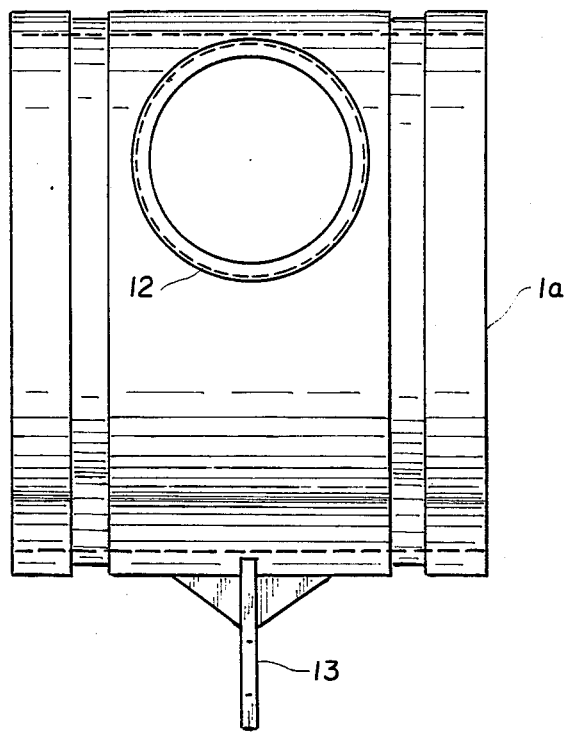
FIG. 4 is an end view of FIG. 5.

Air flow is introduced into the mixing chamber 4 by passing through a curved entrance piece 11, progressively decreasing in diameter as air enters to permit smoother air flow and increased volume. Likewise, as shown in FIGS. 1 and 3, the plurality of rows of openings 5 are similarly flared so as to progressively decrease in diameter when liquid is moving from chamber 6 to mixing chamber 4 and the frusto-conical tubular end piece 10 in the direction indicated by the arrow. Such openings 5 may be frusto-conical in outline or may be progressively curved in an outward direction as entrance piece 11. In addition, openings 5 are angularly skewed relative to the longitudinal axis of the mixing chamber (as shown in FIG. 3a) so that liquid flowing through such openings has a component of motion flow relative to the radius of the mixing chamber to effect a somewhat spiral outward flow helically through end piece 10. The screw angle may be about 8 degrees or any other desired angle preferably under 45°.

As shown in FIG. 2, the inlets 2 and 3 are so shaped as to receive quick-coupling attachments by having a pair of rings 2a, 2a of larger diameter than the ring 2b therebetween. Chamber 4 is of metal, plastic, ceramic, fiberglass or other hard material for handling slurries.

A clamp comprising two semi-circular rings 2c held together by bolts (not shown) provide a quick coupling which, when tightened, compresses seals 2d to make a water-tight fit which can be very quickly assembled or disassembled. A similar claim (not shown) may be used on the opposite side of casing 1. Similar clamps (not shown) may be used to clamp together other component parts of the mixer at positions having similar grooves for receiving the clamps.

Figure 5:
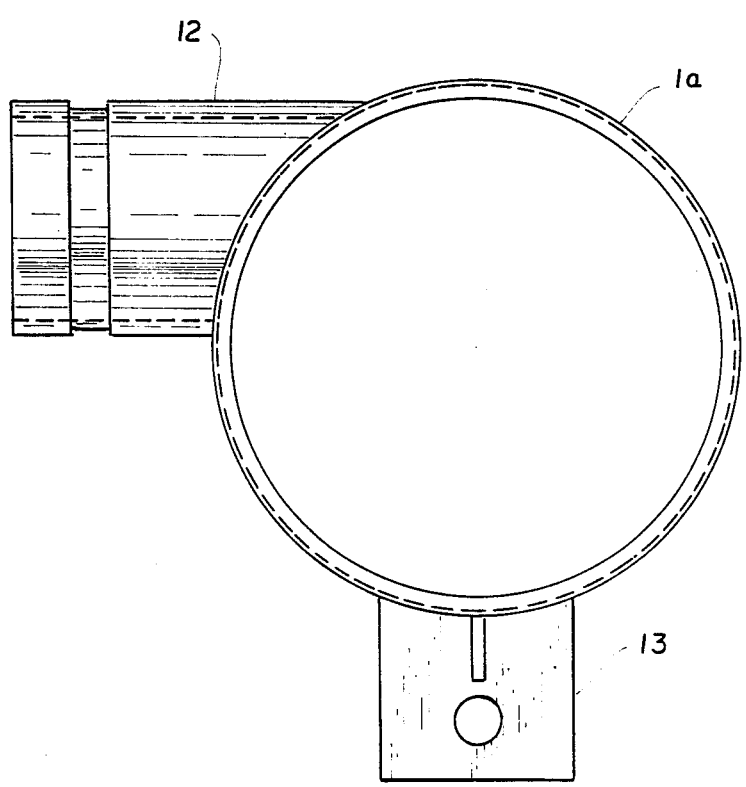
FIG. 5 is an elevational view of a modification for tangential flow.

FIG. 5 shows a modification for obtaining tangential flow comprising an inlet 12 of cylindrical shape entering direclty at one extremity of the cylindrical body 1a mounted on a mounting bracket 13. If desired, a similar shaped outlet (not shown) may be provided at the diametrically opposite end of body 1a.

While the mixer is illustrated as operable in the horizontal position as shown, it is also operable, and sometimes to greater disadvantage, when the device is turned 90 degress such that the discharge end is vertically downwardly, therefore having the assistance of gravity. For example, when powdered reagents are introduced in the inlet end of chamber 4, it is easier for the gradual introduction of dry powders when assisted by gravity.

An important use of the mixer described is in environmental control and in municpal water supplies for the purpose of stripping water of any volatile organic compounds, such as DES or radon gas or other undesirable gases which can be later trapped in activated carbon for the recapture thereof. Also, $CO_2$ or chlorine or $SO_2$ gas may be stripped by the apparatus described. The present mixer can be used more effectively in many instances than modern scrubbers.

Thus it will be seen that I have provided a novel mixer and method of operating it which minimizes turbulence and restriction to water flow by virtue of the tangential flow in the present device, the open and curved inlet end, the outwardly flared outlet end and the progressively narrowed slots surrounding the mixing chamber, all of which also minimize or even prevent the necessity of any inlet water pressure because of the great suction produced by the liquid entering the mixing chamber, which, of course, reduces horsepower requirements. The present device also minimizes back pressure and greatly reduces the air-to-water ratio from in excess of 9 to 1 to about 5 to 1, also it eliminates the accumulation of interior coatings of dry solid reagents which would restrict inlet flow of air; also it eliminates the lengthy time for disassembly of the unit to correct any of the aforementioned problems; also which may be operated vertically, instead of horizontally, to obtain greater improvement in mixing by the aid of gravity.

While I have illustrated and described several embodiments of my invention, it will be understood that these are by way of illustration only and that various changes and modifications may be contemplated in my invention and within the scope of the following claims:

I claim:

1. Mixing apparatus including a cylindrical mixing chamber having a fluid inlet at one end, a frusto-conical tubular end piece connected to the other end and flaring outwardly by progressively increasing in diameter in an outward direction to form a fluid outlet, said cylindrical mixing chamber having a plurality of rows of openings inclined inwardly towards said fluid outlet; and outer jacket surrounding said cylindrical mixing chamber in spaced relationship therewith to form a liquid receiving chamber, and inlet means shaped as to introduce liquid tangentially into said liquid receiving chamber so as to obtain greater water flow and less turbulence in said liquid receiving chamber.

2. Mixing apparatus as recited in claim 1 together with a curved entrance piece to said cylindrical mixing chamber progressively decreasing in diameter to that of said cylindrical mixing chamber.

3. Mixing apparatus as recited in claim 1 wherein said last mentioned inlet means comprises a pair of diametrically opposite inlets angularly disposed towards diametrically opposite sides of said liquid receiving chamber at right angles to said diametrically opposite inlets to effect said tangential flow in said liquid receiving chamber.

4. Mixing apparatus as recited in claim 3 wherein said plurality of rows of openings are angularly skewed relative to the longitudinal axis of said mixing chamber so that liquid flowing through said rows of openings has a component of motion toward said fluid outlet of said mixing chamber and a rotary component of motion relative to the radius of said mixing chamber.

5. Mixing apparatus as recited in claim 4 together with a curved entrance piece to said cylindrical mixing chamber progressively decreasing in diameter to that of said cylindrical mixing chamber.

6. Mixing apparatus as recited in claim 3 wherein said pair of diametrically opposite inlets are progressively curved towards said diametrically opposite sides of said liquid receiving chamber.

7. Mixing apparatus as recited in claim 3 together with quick coupling means at the outer ends of said pair of diametrically opposite inlets, said quick coupling means comprising a pair of closely spaced rings with an inner ring of smaller diameter.

8. Mixing apparatus as recited in claim 1 wherein said plurality of rows of openings are flared inwardly in diameter in the direction towards said fluid outlet.

9. Mixing apparatus as recited in claim 1 wherein the liquid entering said inlet means is raw water to be treated.

10. Mixing apparatus as recited in claim 1 with the skewed rows of openings formed in a hardened material to permit the handling of slurries.

* * * * *